United States Patent [19]

Hayashi et al.

[11] Patent Number: 5,405,563
[45] Date of Patent: Apr. 11, 1995

[54] PROCESS FOR PRODUCING LEATHER-LIKE THERMOPLASTIC POLYESTER SERIES RESIN SHEET

[75] Inventors: Motoshige Hayashi; Norio Amano; Tekeshi Taki; Takaaki Hirai, all of Nara, Japan

[73] Assignee: Sekisui Kaseihin Kogyo Kabushiki Kaisha, Nara, Japan

[21] Appl. No.: 972,725

[22] Filed: Nov. 6, 1992

Related U.S. Application Data

[60] Continuation of Ser. No. 773,005, Oct. 8, 1991, abandoned, which is a division of Ser. No. 699,072, May 13, 1991, Pat. No. 5,110,844.

[51] Int. Cl.$^6$ .............................................. B29C 67/22
[52] U.S. Cl. ........................................ 264/55; 264/54; 264/237; 264/295; 264/321
[58] Field of Search ................. 264/321, 51, 53, 54, 264/55, 232, 237, 295

[56] References Cited

U.S. PATENT DOCUMENTS

| 3,125,542 | 3/1964 | Haines | 264/321 |
|---|---|---|---|
| 3,637,458 | 1/1972 | Parrish | 264/55 |
| 3,661,674 | 5/1972 | Higgs et al. | 156/280 |
| 3,980,513 | 9/1976 | Omori et al. | 264/321 |
| 4,105,738 | 8/1978 | Rohn | 264/321 |
| 4,278,482 | 7/1981 | Poteet et al. | 264/321 |
| 4,466,933 | 8/1984 | Huggard | 264/321 |
| 4,981,631 | 1/1991 | Cheung et al. | 264/321 |
| 5,000,991 | 3/1991 | Hayashi et al. | 264/41 |

FOREIGN PATENT DOCUMENTS

| 0115162 | 8/1984 | European Pat. Off. . |
|---|---|---|
| 0268805 | 6/1988 | European Pat. Off. . |
| 2016512 | 5/1970 | France . |
| 1504165 | 8/1969 | Germany . |
| 925046 | 5/1963 | United Kingdom . |
| 1272575 | 5/1972 | United Kingdom . |
| 1378541 | 12/1974 | United Kingdom . |
| 1381028 | 1/1975 | United Kingdom . |

OTHER PUBLICATIONS

Patent Abstracts of Japan, vol. 9, No. 231 (M-414) (1954), Sep. 8, 1985; & JP-A-60 087 043.
Patent Abstracts of Japan, vol. 4, No. 25 (M-1) (507), Mar. 5, 1980; & JP-A-55 002 045.
Patent Abstracts of Japan, vol. 11, No. 184 (C-427), Jun. 12, 1987; & JP-A-62 004 729.
World Patents Index Latest, Section Ch, week 9132, Jul. 1, 1991, Class A, AN 91-234766, Derwent Publications Ltd, London, GB; & JP-A-3 153 342.

*Primary Examiner*—Allan R. Kuhns
*Attorney, Agent, or Firm*—Armstrong, Westerman, Hattori, McLeland & Naughton

[57] ABSTRACT

A leather-like thermoplastic polyester series resin sheet is disclosed, including a uniformly and finely foamed sheet comprising a thermoplastic polyester series resin, wherein said foamed sheet has cells having a diameter of substantially not longer than 1 mm, the cell walls thereof have a thickness of substantially not thicker than 100 μm, and the cell wall constructing each cell extends with irregular bending so as to make a flexibility of not more than 20,000 mg in the Gurley flexibility test. A process for production of the leather-like thermoplastic polyester series resin sheet is also disclosed.

7 Claims, 5 Drawing Sheets

PROCESS FOR PRODUCING LEATHER-LIKE THERMOPLASTIC POLYESTER SERIES RESIN SHEET

This application is continuation of application Ser. No. 773,005, filed Oct. 8, 1991 and now abandoned, which in turn is a division of application Ser. No. 699,072, filed May 13, 1991 and now U.S. Pat. No. 5,110,844.

FIELD OF THE INVENTION

The present invention relates to a leather-like sheet made of a thermoplastic polyester series resin (hereinafter, is referred to as PAT) and also a process for production of the same.

BACKGROUND OF THE INVENTION

Leather-like sheets made of a synthetic resin are already known. A leather-like synthetic resin sheet is generally called "artificial leather". Conventional artificial leathers are mainly prepared by sticking a surface layer of a foamed synthetic resin onto a basic fabric layer made of fibers and integrating them with each other.

The reason of requiring the basic fabric layer for preparing the conventional artificial leather is that the use of the foamed resin layer only cannot impart the properties, in particular, the tensile strength comparable to a leather to the artificial leather.

Due to the use of the basic fabric layer, a conventional artificial leather has a problem that the basic fabric layer peels off from the resin layer and also has a disadvantage that the production step becomes complicated.

Hitherto, as the synthetic resin for making artificial leathers, polyvinyl chloride series resins and polyurethane series resins have been mainly used since these resins show proper flexibility and can be easily foamed. Also, a polyamide resin was considered possible to use as a synthetic resin for an artificial leather but since it was difficult to foam the polyamide resin, the resin had not been widely used for artificial leathers. Other resins were originally considered to be unsuitable for making artificial leathers or it was difficult to foam these resins and, hence, these resins have never been used for the production of artificial leathers.

On the other hand, PAT has been once formed into fibers, compounded and then used for the production of an artificial leather in place of a basic fabric layer. However, PAT has never been used as a resin layer for an artificial leather since it is difficult to foam PAT. More specifically, the reason is that since PAT is hard, poor in flexibility and crystalline as well as has the characteristic that PAT suddenly changes from a solid to a liquid having a low viscosity at heating, the temperature range showing a viscosity suitable for foaming is narrow, thereby the temperature control at foaming is difficult and also the resin immediately releases gases which become the motive power for foaming, which results in making it difficult to foam the resin.

However, it is known that when PAT containing a foaming agent is extruded in the air from an extruder, it is foamed although the expansion ratio is low. The expansion ratio is usually no higher than twice. When the resin is extruded in a sheet form, the resin can be foamed at a relatively large expansion ratio but even in such a case, the expansion ratio is about 4 times. Thus, it has been attempted to foam PAT at a larger expansion ratio.

JP-A-55-2045 (the term "JP-A" as used herein means an "unexamined published Japanese patent application") describes a process of foaming at a high expansion ratio by extruding PAT containing a foaming agent in a region having a reduced pressure. According to the process described in this patent, it is reported that a foamed material of a circular cross section foamed at an expansion ratio of from 22 times to 32 times was obtained. However, the process has a fault that it is difficult to construct a reduced pressure zone. In particular, it is difficult to undergo this process when it is intended to make an artificial leather. The reason is as follows. That is, since when PAT is extruded in a sheet form, the extruded sheet has an uneven surface by foaming and sometimes is largely deformed by foaming, it is not easy to construct a reduced pressure zone capable of continuously passing therethrough the sheet having such an irregular form and in particular, it is difficult to achieve sufficient reduced-pressure sealing for a sheet form material.

On the other hand, it is known that when a foamed plate made of a styrene series resin is bent, the foamed plate becomes rich in flexibility as described in JP-B-63-60705 (the term "JP-B" as described herein means an "examined published Japanese patent application"). However, the resin to be used in this patent is limited to a styrene series resin and the patent publication teaches nothing about a foamed plate of PAT. Also, the patent publication teaches only that the flexible foamed plate thus obtained is suitable for a material being used by bending as a cushioning material, a heat insulating material, or a packing material and teaches nothing about a material becoming a leather.

The present inventors have attempted to make an artificial leather by foaming PAT which was generally considered reluctant to foam and tried to foam PAT by extruding PAT in the air. As the result, it has been found that when PAT is extruded under a proper condition, a sheet foamed at about 4 times is obtained. Furthermore, the inventors have discovered that when the foamed sheet thus obtained is heated by being brought into contact with steam, etc., the sheet is further expanded to become a sheet uniformly and finely foamed at a higher expansion ratio.

Also, the inventors have further discovered that when the uniformly and finely foamed PAT sheet thus obtained is compressed by holding the sheet between rolls at normal temperature, the sheet increases the flexibility, whereby a leather-like flexible, high tensile strength, high tear strength and tough sheet is obtained. Furthermore, the inventors have confirmed that when the above-described uniformly and finely foamed PAT sheet is bent or crumpled in place of compressing by holding the sheet between rolls, a leather-like sheet is similarly obtained.

Also, as the result of investigating the structure of the leather-like sheet obtained as described above, it has been confirmed that the leather-like sheet is uniformly and finely foamed as well as the cell walls are in a specific state and also the whole sheet has a specific flexibility.

In this case, the term "uniformly and finely foamed" means that the cells are small ones having a diameter of substantially 1 mm or shorter and the cell walls are in a state having a thickness of not thicker than 100 $\mu$m.

Also, the term "the cell walls are in a specific state" means that at least part of the cell walls extends while irregularly bending. Moreover, the term "the whole sheet has a specific flexibility" means that the sheet has a small value of flexibility by the Gurley flexibility test of no higher than 20,000 mg. Furthermore, it has been found that when the leather-like sheet is immersed in a strong alkali solution, the cells become continuous to render the sheet breathable and water absorptive.

The present invention has been made based on the above-described knowledges.

SUMMARY OF THE INVENTION

That is, the present invention has been made for obtaining a sheet having a property comparable to a leather by the sheet only obtained by foaming PAT.

An object of the present invention is to provide a sheet comprising a foamed sheet of PAT having the appearance and properties of natural leather.

Other object of the present invention is to provide a sheet comprising a foamed sheet of PAT having the properties of a flexible, high tear strength and tough leather.

Also, a still other object of the present invention is a sheet provided with continuous cells, which has the properties similar to a natural leather having breathability and water absorbing property.

A further object of the present invention is to provide a process for easily producing a foamed sheet of PAT having the properties of a flexible, high tear strength and tough leather.

Another object of the present invention is to provide a process for producing a foamed sheet of PAT having the properties of a leather having breathability and water absorbing property by immersing the foamed sheet in a strong alkali solution to form continuous cells.

As described above, the present invention includes an invention about a product and an invention of a process for production of the same. The invention of the product relates to a leather-like PAT sheet and the invention of the process for production relates to a process for production of a leather-like PAT sheet.

Thus, according to an embodiment of the present invention, there is provided a leather-like PAT sheet, wherein the sheet has fine cells having a diameter of substantially not larger than 1 mm, the cell walls have a thickness of substantially not thicker than 100 μm, the cell wall of each cell extends while irregularly bending, and the flexibility as a sheet by the Gurley flexibility test is not more than 20,000 mg.

Also, according to another embodiment of the present invention, there is provided a process for production of a leather-like PAT sheet, which comprises applying the force of compression or bending to a uniformly and finely foamed PAT sheet, in which the foamed sheet has cells having a diameter of substantially not longer than 1 mm and the cell walls have a thickness of substantially not thicker than 100 μm, to make the cell wall constituting each cell a state of extending while irregularly bending.

DETAILED DESCRIPTION OF THE INVENTION

PAT which can be used in the present invention is a high molecular weight chain polyester obtained by reaction of an aromatic dicarboxylic acid and a dihydric alcohol.

As the aromatic dicarboxylic acid, terephthalic acid is most frequently used but isophthalic acid or 2,6-naphthalenedicarboxylic acid is sometimes used. Furthermore, diphenyl ether dicarboxylic acid, diphenyl sulfone dicarboxylic acid, or diphenoxydicarboxylic acid is, as the case may be, used.

On the other hand, as the dihydric alcohol, ethylene glycol is mainly used but trimethylene glycol, tetramethylene glycol, neopentylene glycol, hexamethylene glycol, cyclohexanedimethylol, tricyclodecanedimethylol, 2,2-bis(4-β-hydroxyethoxyphenyl)propane, 4,4'-bis(β-hydroxyethoxy)diphenyl sulfone, or diethylene glycol may be used.

The above-described PAT is commercially available and in the present invention, commercially available PAT can be used.

Examples of PAT which is suitably used in the present invention polyethylene terephthalate, polybutylene terephthalate, a polybutylene terephthalate elastomer, non-crystalline polyesters, and polycyclohexane terephthalate.

These resins can be used singly or as a mixture thereof. Also, the above-described resin(s) can be used as a mixture thereof and other resin than PAT. When other resin than PTA is used as a mixture with PAT, the content of the resin is less than that of PAT.

The leather-like sheet in the present invention must be a uniformly and finely foamed sheet. This can be defined by the size of the cell, the thickness of the cell walls, the density of the sheet, etc. The size of the cell in the present invention is substantially not larger than 1 mm, and preferably not larger than 500 μm. In this case, the term "substantially not larger than 1 mm" means that the size of the greater part of the cells is not larger than 1 mm and does not mean that cells larger than 1 mm must not exist in the foamed sheet. The same is true for the thickness of the cell walls and the thickness of the cell walls is substantially not thicker than 100 μm, preferably not thicker than 50 μm, and more preferably not thicker than 20 μm.

Also, the size of the cell is generally larger than the thickness of the cell. The density of the foamed sheet is in the range of not more than 1.1 g/cc, preferably not more than 0.8 g/cc, and more preferably from 0.15 g/cc to 0.5 g/cc.

Figure 1:
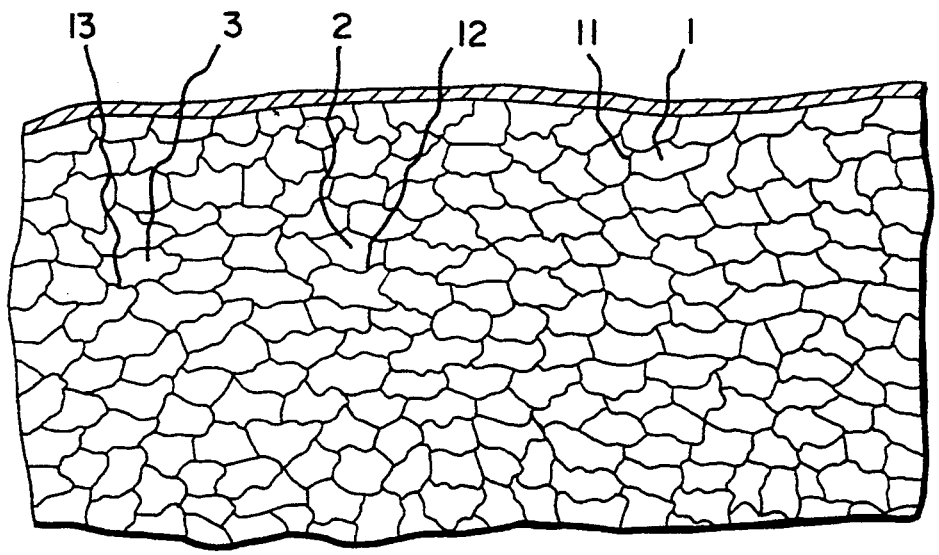
FIG. 1 is an enlarged schematic cross section of the leather-like PAT foamed sheet of the present invention in the thickness direction.
Figure 2:
FIG. 2 is a microscopic photograph (magnification: about 35 times) showing an enlarged cross section of one example of the leather-like PAT foamed sheet of the present invention in the thickness direction.

The important feature of the leather-like sheet of the present invention is that the cell walls extend with irregular bending. This can be more clearly seen in the enlarged cross section. FIG. 1 shows an enlarged schematic cross section of the leather-like PAT foamed sheet of the present invention cutting in the thickness direction of the sheet. FIG. 2 is a microscopic photograph (magnification: about 35 times) showing an enlarged cross section of one example of the leather-like PAT foamed sheet of the present invention in the thickness direction.

In FIG. 1, numerals 1, 2, 3,—each shows a cell and numerals 11, 12, 13,—each shows a cell wall dividing each cell, respectively. Each of the cell walls 11, 12, 13,—bends with various amplitudes of several times larger than the thickness of the wall. These bendings include one peaked bending as the case of folding back a paper and a bending composed of many creases as the case of randomly smashing a paper in a hand and spreading the paper. The cell walls are teared and cracked in places.

Figure 3:
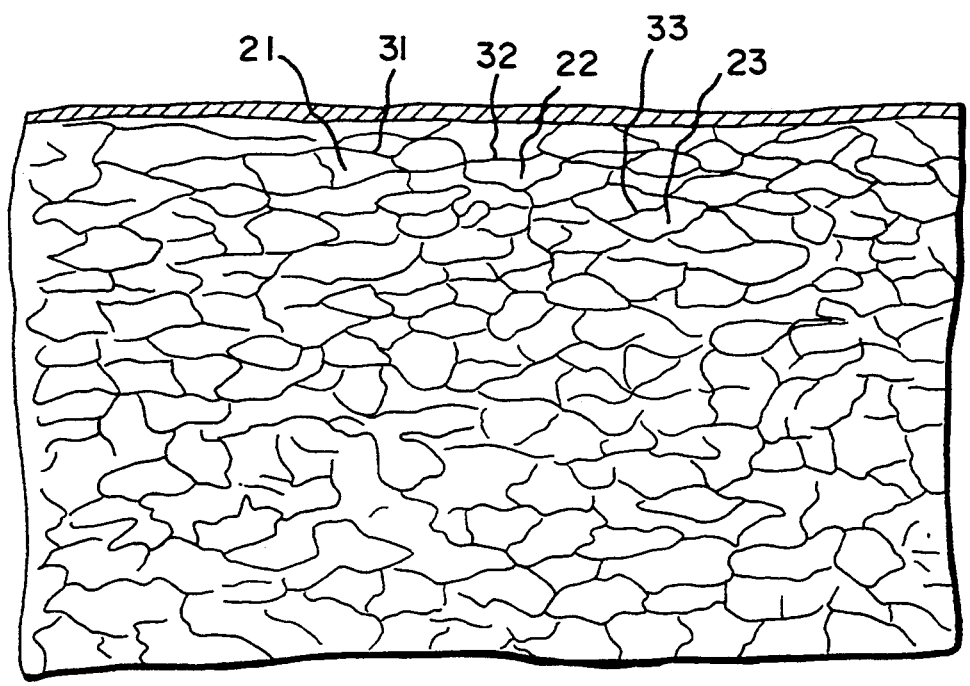
FIG. 3 is an enlarged schematic cross section of a conventional PAT foamed sheet in the thickness direction.

On the other hand, an enlarged schematic cross section of a conventional PAT foamed sheet in the thickness direction is as shown in FIG. 3.

In FIG. 3, numerals 21, 22, 23,—each shows a cell and numerals 31, 32, 33,—each shows a cell wall each dividing each cell. Also, a microscopic photograph (magnification: about 50 times) showing an enlarged cross section of one example of a conventional PAT foamed sheet in the thickness direction is shown in FIG. 4.

Figure 4:
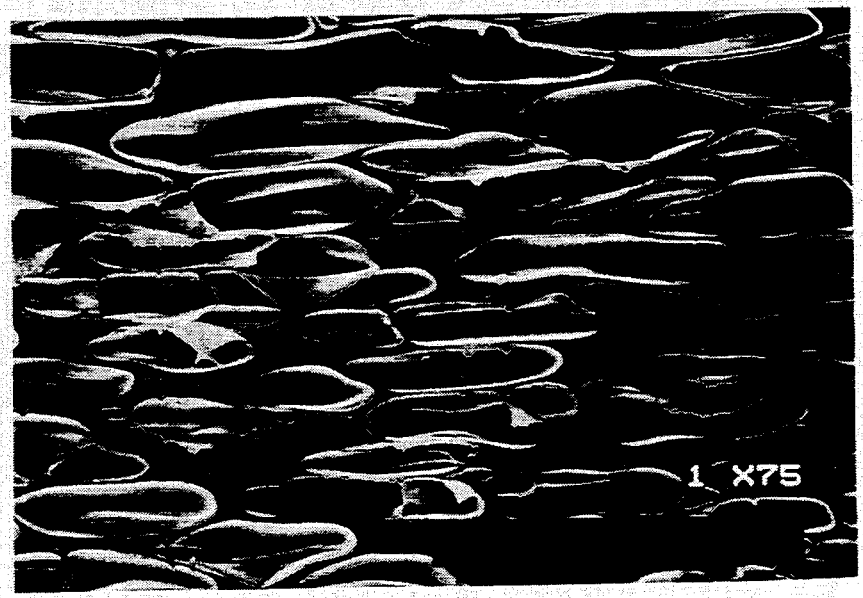
FIG. 4 is a microscopic photograph (magnification: about 50 times) showing an enlarged cross section of one example of a conventional PAT foamed sheet in the thickness direction.

As seen from FIGS. 3 and 4, cell walls 31, 32, 33—are curved to some extent. The curve between two adjacent specific cells always forms a convex form or a concave form to one cell side and scarcely forms an intermingled state of convex forms and concave forms.

Thus, in a conventional foamed sheet, the cell walls are not irregularly bent. Also, even in a conventional foamed sheet, some of the cell walls may be cracked but the number of the cracks is far less than those of the leather-like sheet of the present invention.

As described above, the leather-like sheet of the present invention is utterly different from a conventional foamed sheet in the point that in the former sheet, the cell walls are irregularly bent.

Also, the leather-like sheet of the present invention is different from a conventional PAT foamed sheet in the point of flexibility.

For example, as to an ordinary PAT foamed sheet which is a polyethylene terephthalate sheet obtained by foaming using butane as a foaming agent and has a basis weight of 400 g/m$^2$, a thickness of 1.50 mm, and a density of 0.27 g/cc, the flexibility measured by the Gurley flexibility test (as defined in JIS L 1096-1990—hereinafter the same) is 48,326 mg. On the other hand, as to the leather-like sheet of the present invention made of an ordinary PAT foamed sheet and having a basis weight of 397 g/m$^2$, a thickness of 1.29 mm, and a density of 0.31 g/cc, the flexibility is 16,751 mg. Furthermore, by applying the similar test to various PAT foamed sheets, it has been confirmed that the flexibility of conventional PAT foamed sheets is higher than 40,000 mg but the flexibility of the leather-like foamed sheets of the present invention is not higher than 20,000 mg.

Accordingly, the leather-like PAT foamed sheet of the present invention is specific in the point that the Gurley flexibility is not higher than 20,000 mg.

Figure 6:
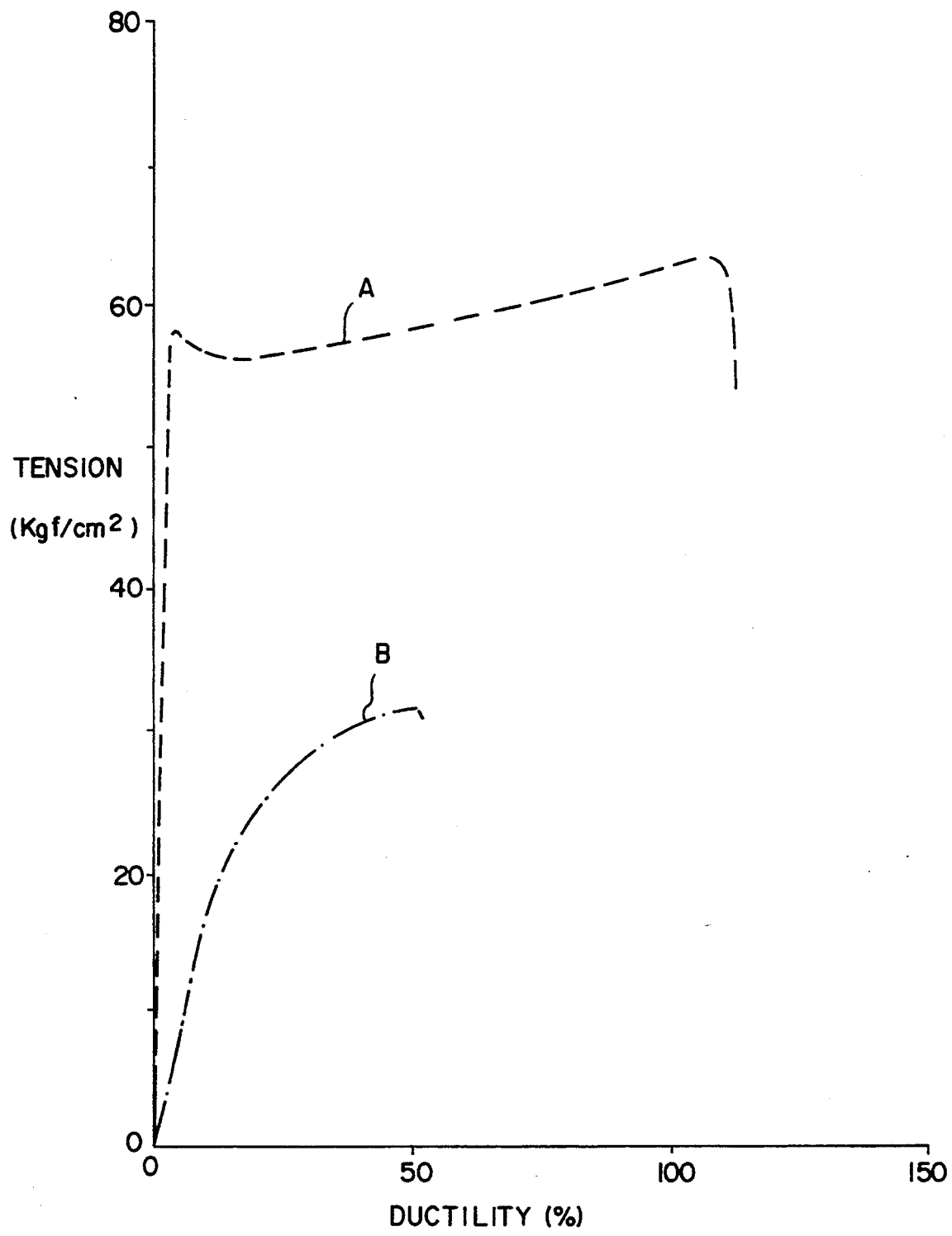
FIG. 6 is a graph showing comparatively the ductility of the leather-like PAT foamed sheet of the present invention and the ductility of a conventional PAT foamed sheet.

Also, the PAT foamed sheet of the present invention shows a specific ductility curve as compared to that of an ordinary PAT foamed sheet. For example, the above-described ordinary PAT foamed sheet, i.e., the polyethylene terephthalate foamed sheet having a basis weight of 400 g/m$^2$, a thickness of 1.50 mm and a density of 0.27 g/cc shows the tension-ductility relation shown by broken line A in FIG. 6, while the leather-like PAT foamed sheet of the present invention made from the aforesaid sheet having a basis weight of 397 g/m$^2$, a thickness of 1.29 mm, and a density of 0.31 g/cc shows the tension-ductility line relation shown by one-dot and dash line B in FIG. 6.

That is, during the application of a tension of less than about 20 kg/cm$^2$, the leather-like foamed sheet of the present invention increases the ductility in proportion to the tension and already shows the ductility of about 50% at a tension of about 32 kg/cm$^2$. On the other hand, the above-described ordinary PAT foamed sheet shows a ductility of less than 5% and scarcely increases the ductility by only the application of the force up to about 50 kg/cm$^2$ and when a force of about 60 kg/cm$^2$ is applied, the sheet first shows suddenly a large ductility of 100% or higher.

As described above, the leather-like PAT foamed sheet of the present invention is specific in the point that the sheet already shows a large ductility of several % to several tens % by a small tension of up to about 30 kg/cm$^2$.

Then, the production process for the leather-like PAT foamed sheet according to the present invention is explained. That is, according to the production process, the uniformly and finely foamed sheet of PAT, in which the foamed sheet has cells having a diameter of substantially not longer than 1 mm and the cell walls have a thickness of substantially not thicker than 100 μm, is used as the starting material and a force of compression or bending is applied to the foamed sheet at a temperature of not higher than the glass transition point of the resin to extend the cell walls with wavy bending.

The foamed sheet of PAT which is used as the starting material in the production process of the present invention may be produced by any production process. For example, the uniformly and finely foamed PAT sheet obtained by foaming a PAT sheet in a reduced pressure zone according to the teaching of JP-A-55-2045 described above can be used as the starting material in the process of the present invention. However, a process of carrying out the foaming twice as will be described below is preferred.

That is, in the process of carrying out the foaming twice, high-temperature PAT containing a foaming agent is extruded in a sheet form followed by quickly cooling directly thereafter to form a primary foamed sheet, and thereafter the primary foamed sheet is further foamed by heating to a temperature of at least 60° C. to provide a secondary foamed sheet.

For extruding PAT, as hitherto practiced, PAT is melted in an extruder, a foaming agent is charged under pressure in the extruder from an intermediate portion thereof, followed by kneading, and the kneaded mixture may be extruded in a sheet form from a die equipped to the extruder. At extruding the kneaded mixture, the form of the cross section of the extruded product may be an annular form or a straight line form. When the cross section is annular, the cylindrical product thus extruded is opened by cutting to form a flat sheet.

The sheet directly after extruding is quickly cooled or quenched since the crystallinity of the primary foamed sheet is lowered no higher than 30%. The quenching temperature is not higher than the glass transition point of PAT.

In the present invention, by utilizing the fact that the secondary foamed sheet thus obtained has been foamed in such a state that the sheet has uniform and fine cells having a diameter of substantially not longer than 1 mm and the cell walls defining the cells have a thickness of substantially not thicker than 100 μm, the secondary foamed sheet is compressed or bent at a temperature of not higher than the glass transition point of PAT, thereby the cell walls become irregularly bent.

For compressing or bending the uniformly and finely foamed PAT sheet, various methods can be used.

For example, in the case of compressing the foamed sheet, the compressing direction may be the thickness direction, the lengthwise direction, or the width direction of the foamed sheet. However, the thickness direction can be easily compressed. In the case of compressing the sheet to the thickness direction, the sheet may be compressed partially or wholly but partial compressing is preferable.

Also, for bending the PAT foamed sheet, the bending direction may be any direction but the lengthwise direction and the width direction of the sheet are preferred and the lengthwise direction is more preferred. Also compressing and bending may be applied singly but it is desirable to apply them as a proper combination thereof.

In practice, it is preferable to continuously carry out compressing and/or bending as a combination thereof. For example, there are a method of partially compressing the surface of the foamed sheet by passing the sheet through embossing rolls having uneven surfaces, a method of partially compressing the foamed sheet to the thickness direction and at the same time extending or loosening the sheet by passing the sheet through many pair rolls, and a method of bending the sheet to the lengthwise direction of the sheet and at the same time extending or loosening sheet to the lengthwise direction by passing zigzag the sheet through many rolls.

It is necessary that above-described compressing or bending is carried out in the state that the temperature of the PAT foamed sheet is not higher than the glass transition point of PAT. The glass transition point of PAT differs according to the kinds of a dicarboxylic acid and a dihydric alcohol constituting PAT but is generally in the range of from 30° C. to 90° C. Accordingly, the PAT foamed sheet is compressed or bent at a temperature of 60° C. or lower.

Since PAT is a resin which is easily hydrolyzed at a high temperature, in the case of foaming PAT by extruding from an extruder, it is desirable to previously dry PAT. For drying, it is preferred to use, for example, a dehumidifying dryer. The drying condition in this case may be that air having a dew point of, for example, −30° C. is heated to 160° C. and PAT is exposed to the air for about 4 hours.

As the foaming agent, various compounds can be used in the present invention. They can be generally classified into a solid compound which is decomposed at a temperature of the softening point of PAT or higher to generate gases, a liquid which is vaporized in PAT by heating, and an inert gas which can be dissolved in PAT under pressure. The materials classified as above can be all used in the present invention.

Examples of the aforesaid solid compound are azodicarbonamide, dinitrosopentamethylenetetramine, hydrazocarbonamide, and sodium bicarbonate. Examples of the aforesaid liquid which is vaporized in PAT are saturated aliphatic hydrocarbons such as hexane, pentane, butane; saturated alicyclic hydrocarbons such as cyclohexane; aromatic hydrocarbons such as benzene, xylene; and halogenated hydrocarbons such as methylene chloride, Freon (a trade name, made by E. I. Du Pont de Nemours and Company). Also, examples of the inert gas are carbon dioxide and nitrogen. Also, as other foaming agent, the high-molecular weight chain aromatic polycarbonate described in JP-A-59-135237 can be also used in the present invention.

When softened PAT containing a foaming agent is extruded from a die of the extruder, PAT is foamed. The foaming is the primary foaming in the present invention and the foamed product obtained is a primary foamed sheet. The primary foamed sheet has a low expansion ratio and usually has a high density. The expansion ratio differs according to the form of the foamed product but is about 5 times only.

In the present invention, the primary foamed sheet thus obtained is quenched directly after forming and while the sheet is at a high temperature to a temperature of the glass transition point of PAT or lower.

When the primary foamed sheet is quenched, the foamed sheet is solidified without a time of being crystallized and, hence, the crystallinity thereof is low. The crystallinity differs according to the extent of quenching. For example, the crystallinity differs according to the kind of a cooling medium, the temperature of a cooling medium, the contact state with a cooling medium, etc.

When the primary foamed sheet prepared by extrusion is cooled by direct contact with water of normal temperature, the crystallinity of the primary foamed sheet becomes several percent, and is usually lower than 30%. However, when the primary foamed sheet prepared by extrusion is introduced to a mold to adjust the form and the mold is not forcibly cooled, the foamed sheet is not quenched and hence the crystallinity becomes higher than 30%. In particular, the wall-thick primary foamed sheet has a crystallinity of higher than 30%. Accordingly, when the primary foamed sheet is produced by an extruder, the primary foamed sheet is quenched by moving along a mold which is forcibly cooled.

For effectively quenching the primary foamed sheet, it is desirable that the thickness of the primary foamed sheet is as thin as possible such that the primary foamed sheet has a large surface area as compared to the volume thereof. That is, it is desirable that the width of the primary foamed sheet is increased as large as possible and the thickness thereof is thinned to not more than 10 mm, in particular not more than 3 mm. In this case, when the foamed sheet is extruded in the cylindrical form, a mandrel is disposed in a cylinder, the cylindrical foamed sheet is moved along the mandrel, and the mandrel is cooled with water as well as the length of the mandrel is increased as long as possible.

On the other hand, when the foamed sheet is extruded in a tubular form, the sheet is advanced between a pair of rolls with cooling, and the rolls are cooled with water as well as the rolls having a diameter of as large as possible are employed. Thus, the crystallinity of the primary foamed sheet is kept at no higher than 30%.

In general, the crystallinity of a resin can be measured by the density, the X-ray diffraction pattern, the nuclear magnetic resonance absorption spectra, etc., but since a foamed resin sheet contains bubbles therein, the crystallinity thereof cannot be measured by these methods. Accordingly, the crystallinity of the primary foamed sheet of PAT must be measured by a thermal method such as a method of measuring the heat quantity of fusion and heat quantity of cold crystallization. The principle utilizes the characteristic that when the PAT foamed sheet is heated at a constant rate, the crystals increase first and thereafter are melted but at the increase of the crystals, a heat is generated and at melting the heat of fusion is absorbed. Practically, the heat quantity of cold crystallization generated by crystallization and the heat quantity of fusion generated by melting are measured and the crystallinity is calculated by comparing the measured value with the heat quantity of fusion shown by a standard sample of complete crystal.

For practically measuring the heat quantity of cold crystallization and heat quantity of fusion of the PAT foamed material, it is preferred to undergo the measurement by a method using a differential scanning calorimeter. In the method using a differential scanning calorimeter, a heater for a sample to be measured and a heater for a standard sample work independently from each other and if a temperature difference occurs between them during constant-rate heating, one of the increasing or controlling mechanisms of heat flow acts automatically to nullify the temperature difference and, hence, a difference of the heat flow rates is directly recorded. The crystallinity is theoretically calculated by the following equation:

Crystallinity(%) = $(A-B)/C \times 100$

A: Heat quantity of fusion per mol
B: Heat quantity of cold crystallization per mol
C: Heat quantity of fusion per mol of complete PAT crystal In this case, the heat quantity of fusion per mol of a complete PAT crystal is described to be 26.9 KJ according to Kobunshi (High Molecule) Data Handbook, published by Baifukan and this value is used in the present invention.

In the present invention, the PAT primary foamed sheet having a crystallinity of not higher than 30% is subjected to the second time of foaming and this is secondary foaming. At the secondary foaming, the primary foamed sheet is heated to a temperature of at least 60° C. There is no particular restriction on the heating means. That is, heating by conduction, heating by radiation, heating by convection, heating by high frequency electric power, etc., can be employed in the present invention. Also, any heating media which do not corrode PAT can be used. In these heating methods, a method of heating the primary foamed sheet of PAT by bringing the foamed sheet into contact with a heated metal or heated air, or bringing the foamed sheet into contact with steam or heated water is preferred.

The heating time at secondary foaming is properly determined according to the nature and form of PAT and the kind and temperature of the heating medium. In general, when the temperature of the heating medium is low, the heating time is prolonged and in the contrary, when the temperature of the heating medium is high, the heating time is shortened. Also, when the thickness of the foamed sheet is thick, the heating time is prolonged and on the contrary, when the thickness is thin, the heating time is shortened.

When the primary foamed material is heated by contacting with a metal plate, the metal plate is heated to a temperature of from 60° C. to 200° C., and it is preferred to contact them for a time of at least 5 seconds.

Also, when the primary foamed material is heated by bringing into contact with air, it is desirable to place the primary foamed material in an oven kept at an inside temperature of from 100° C. to 230° C. and to heat it for from 10 seconds to 5 minutes. In the case of heating the primary foamed material with a metal plate or air, it is desirable to avoid the application of secondary foaming directly after primary foaming and to perform secondary foaming after allowing to stand the foamed material after primary foaming for at least 24 hours and usually for 3 days.

On the other hand, when the primary foamed material is heated by bringing into contact with steam, the primary foamed material can be subjected to secondary foaming directly after primary foaming. In this case, the temperature of steam or water is from 60° C. to 125° C. and the contact time is from 10 seconds to 10 minutes. If the temperature of steam or water is over 125° C., there is a possibility of decomposing the primary foamed material and, hence, it is recommended to avoid the employment of such a high temperature.

For contacting the PAT foamed material with steam or heated water, various modes can be employed.

Figure 7:
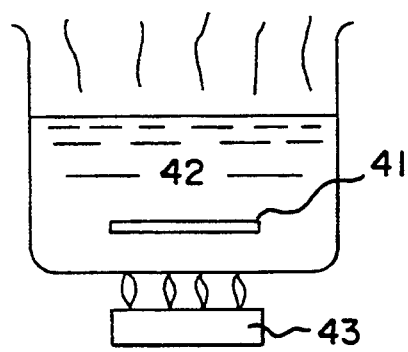
FIG. 7 to FIG. 9 are schematic views showing various embodiments of carrying out secondary foaming in the process of the present invention.
Figure 8:
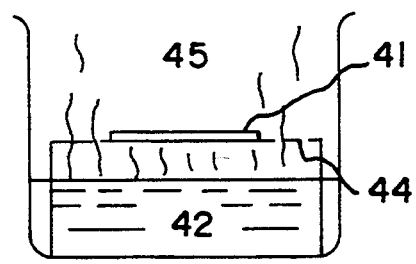
Figure 9:
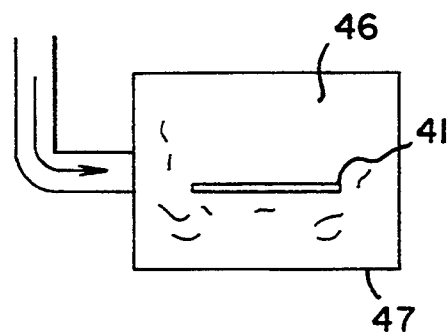

For example, as shown in FIG. 7, a primary foamed PAT material 41 may be immersed in heated water 42. In FIG. 7, numeral 43 means a burner. Also, as shown in FIG. 8, a metallic wire net 44 is placed above the surface of heated water 42, a primary foamed material 41 is placed on the wire net 44, and the foamed material 41 may be brought into contact with steam 45 coming from water 42 by vaporization. Furthermore, as shown in FIG. 9, compressed steam 46 may be blown into a container 47 containing a foamed material 41.

Also, at the case of heating the foamed material by contact with heated water or steam, it is desirable the foamed material is placed in a mold to mold the material into a desired form. In the case of using a mold, heated water or steam is pressed in the mold containing the foamed material to directly contact with the material.

As described above, when the PAT foamed material is heated by bringing into contact with water heated above 60° C. or steam, the PAT foamed material is secondarily foamed to become a foamed material having a low density.

In general, heating by hot water or steam can be more easily applied to secondary foaming than heating by air heating. By heating with hot water or steam, the expansion ratio of the secondary foamed material is at least 1.3 times and even more than 4 times in the case of a large expansion ratio. Furthermore, in the aforesaid case, foaming can be uniformly carried out and the secondary foamed material obtained has fine and uniform cells. Thus, a foamed material having a good quality and a low density can be obtained.

At the practice of the present invention, PAT may contain various additives. For example, PAT may contain a small amount of talc as a cell controlling agent, an antistatic agent, a pigment, a flame retarder, and from 0.5 to 5% by weight an acid dianhydride such as pyromellitic anhydride, an epoxy compound such as diglycidyl terephthalate, an oxide of a metal belonging to group Ia or IIa of the periodic table, or sodium carbonate for improving the melting characteristics of PAT singly or as a mixture thereof.

Also, at the practice of the present invention, the secondary foamed material obtained is kept at a high temperature of, e.g., at least 200° C. to increase the crystallinity of PAT, whereby the secondary foamed material having a more improved heat resistance can be obtained.

The secondary foamed sheet thus obtained is compressed or bent as described hereinbefore to provide a leather-like PAT foamed sheet.

Furthermore, in the present invention, the foamed sheet or leather-like sheet of PAT is immersed in an alkali solution for imparting a water absorption property or breathability thereto.

As the alkali solution, there are aqueous solutions of hydroxides, carbonates, and phosphates such as sodium hydroxide, potassium hydroxide, calcium hydroxide, magnesium hydroxide, calcium carbonate, sodium carbonate, sodium phosphate, potassium phosphate, etc.

The pH of the aforesaid alkali solution is preferably at least 12.5 and when the foamed sheet or the leather-like sheet is immersed in such an alkali solution and heated to a temperature of from 80° C. to 100° C. for a time of from 20 minutes to 30 minutes, the proportion of continuous cells becomes from 45% to 80%. In the case of a foamed sheet, the sheet is further compressed or bent to provide a leather-like PAT foamed sheet.

Furthermore, by rubbing the surface of the sheet obtained by the aforesaid process with a sand paper, a brush, a file, etc., a back skin-form leather-like sheet can be obtained.

Also, a metal vapor deposition or coating can be applied to the surface of the PAT foamed sheet. Furthermore, before or after compressing or bending the foamed sheet, a colored film or a metal vapor-deposited film, etc., may be laminated on the foamed sheet.

As described above, according to the present invention, the leather-like PAT foamed sheet obtained has uniform and fine cells having a diameter of substantially not longer than 1 mm and the cell walls thereof have a thickness of substantially not thicker than 100 $\mu$m. Thus, the foamed sheet has an appearance like a natural leather. Furthermore, since the leather-like foamed sheet of the present invention is a foamed sheet using PAT as the material, the cell walls constructing the cells extend with irregular bending to give flexibility as a sheet of not more than 20,000 mg in the Gurley flexibility test, the foamed sheet has a strength and feeling like a natural leather. Moreover, since the leather-like foamed sheet of the present invention is made of PAT only, the foamed sheet has a characteristic that the production is easy. Accordingly, the leather-like sheet of the present invention can be expected to be widely used in place of natural leathers. The present invention is very advantageous in this point.

Also, according to the present invention, by applying a force of compression or bending to a uniformly and finely foamed sheet of PAT having cells of a diameter of substantially not longer than 1 mm and having cell walls having a thickness of substantially not thicker than 100 $\mu$m at a temperature of not higher than the glass transition point of PAT, the cell walls can be easily formed into an irregularly bent state, whereby a leather-like PAT foamed sheet can be easily made. Accordingly, by the process of the present invention, a leather-like sheet can be continuously and easily supplied at a low cost. In this point, the production process of the present invention is also industrially very advantageous.

Furthermore, according to the production process of the present invention, since PAT containing a foaming agent is foamed by extrusion to form a foamed sheet and the foamed sheet at a high temperature directly after extrusion is quenched below the glass transition point of PAT to provide a primary foamed material having a crystallinity of PAT of not higher than 30%, the crystallinity of the primary foamed sheet is low and, hence, the primary foamed sheet can be easily foamed by heating again. In the present invention, since such a primary foamed sheet is foamed by heating to a temperature of at least 60° C., the secondary foamed sheet is formed at a high expansion ratio. Accordingly, the secondary foamed sheet has uniform and fine cells having a diameter of substantially not longer than 1 mm and has the cell walls having a thickness of substantially not thicker than 100 $\mu$m. In the present invention, since a force of compression or bending is applied to such a secondary foamed sheet at a temperature of not higher than the glass transition point of PAT, a leather-like sheet can be easily produced as described above. Accordingly, by the production process of the present invention, a leather-like sheet can be continuously and more easily supplied at a low cost. The production process of the present invention is also very advantageous in this point.

Also, according to the present invention, by immersing the leather-like foamed sheet or intermediate foamed sheet in an alkali solution, the cells thereof become continuous cells, whereby breathability and water absorbing property can be easily imparted to the leather-like sheet. As described above, the foamed sheet having the gas permeability and water absorbing property is more similar to a natural leather in terms of the properties.

Also, the leather-like PAT foamed sheet of the present invention does not cause cracking from the seams by needles and has a sufficient sewing strength. Thus, by sewing the leather-like foamed sheet of the present invention, bags, suitcases, clothes, etc., can be easily made.

Then, by referring to the examples of the present invention and comparison examples, the merits of the present invention are practically explained, in which parts and percents are all by weight unless otherwise indicated.

EXAMPLE 1

(Production of primary foamed sheet)

By using polyethylene terephthalate ("TR 8580", a trade name made by Teijin Limited) as PAT, the following composition was prepared.

| PAT | 100 parts |
|---|---|
| Talc | 0.6 part |
| Pyromellitic Anhydride | 0.3 part |
| Sodium Carbonate | 0.1 part |

The aforesaid composition was placed in an extruder having a diameter of 65 mm, and the temperature of the supply portion of the extruder was set at 280° C., the temperature of the compressive portion at 285° C., the temperature of the melting portion and the temperature of the head portion at 275° C., the temperature of the mold at 270° C., and the screw revolution number at 25 r.p.m., respectively. Also, while pressing in 1.3 parts of butane into the composition as a foaming agent from the intermediate portion of the extruder, the composition was extruded. An annular die having an inside diameter of 60 mm and a slit width of 0.4 mm was used. Also, a plug having a diameter of 205 mm and a length of 740 mm was equipped to the top of the die and the plug was quenched with water of 25° C.

The cylindrical foamed sheet thus obtained was opened by cutting to provide a flat sheet which was then once wound into a roll form to provide a primary foamed sheet. The primary foamed sheet had a basis weight of 400 g/m$^2$, a thickness of 1.50 mm, a density of 0.27 g/cc, a mean cell size of 320 μm, and a mean cell wall thickness of 30 μm. Also, the crystallinity of the primary foamed sheet was 8% and the flexibility thereof was 48,326 mg.

(Production of secondary foamed sheet)

Thereafter, the primary foamed sheet obtained was further foamed by bringing the sheet into contact with steam of 100° C. for 5 minutes and the foamed sheet was allowed to cool at room temperature to provide a secondary foamed sheet. The secondary foamed sheet thus obtained had a basis weight of 400 g/m$^2$, a thickness of 5.6 mm, a density of 0.07 g/cc, a mean cell size of 560 μm, and a mean cell wall thickness of about 20 μm. Also, the flexibility of the secondary foamed sheet was 58,488 mg.

(Treatment of secondary foamed sheet)

For softening the secondary foamed sheet obtained above, the foamed sheet was compressed by embossing rolls at room temperature (25° C.). As the embossing rolls, a pair of rolls each having a diameter of 14 cm were used and the gap between the rolls was 0.3 mm. On the surface of the roll, grooves having a width of 0.2 mm and a depth of 0.5 mm were formed at an interval of 1 mm in both the axial direction and the peripheral direction of the roll. Also, the revolution rate of the rolls was 3 r.p.m. and the secondary foamed sheet was passed once through the rolls.

The secondary foamed sheet thus compressed was a good leather-like sheet. The leather-like sheet had a basis weight of 404 g/m$^2$, a thickness of 1.56 mm, a density of 0.25 g/cc, a maximum point tensile strength of 4.90 kg/cm, a tensile elongation at break of 39.6%, a maximum tear strength of 1.12 kg, and a flexibility of 12,118 mg. Also, when the sheet was tried to be teared by hand, the sheet could not be teared.

EXAMPLE 2

In this example, the primary foamed sheet obtained in Example 1 was immersed in boiling water to cause secondary foaming and the secondary foamed sheet was compressed by rolls each having a smooth surface to provide a leather-like sheet. The details were as follows.

(Production of secondary foamed sheet)

The primary foamed sheet was immersed in boiling water for 2 minutes to cause secondary foaming and then allowed to cool at room temperature to provide a secondary foamed sheet. The secondary foamed sheet had a basis weight of 400 g/m$^2$, a thickness of 5.2 mm, a density of 0.07 g/cc, a mean cell size of 560 μm, and a mean cell wall thickness of about 20 μm.

(Treatment of secondary foamed sheet)

For softening the secondary foamed sheet obtained above, the sheet was compressed by rolls. The rolls each having a diameter of 14 cm and a smooth surface were used and the rolls were faced with each other at a gap Of 0.3 mm. The rolls were revolved at a rate of 3 r.p.m. and the secondary formed sheet was passed once through the rolls. On the surface of the foamed sheet were formed small creasy unevennesses to show a leather-like appearance. The leather-like sheet obtained had a basis weight of 404 g/m$^2$, a thickness of 1.43 mm, a density of 0.28 g/cc, and a flexibility of 12,296 mg.

EXAMPLE 3

In this example, the secondary foamed sheet obtained in Example 1 was compressed by a press to provide a leather-like sheet. The details were as follows.

For softening the secondary foamed sheet, the sheet was inserted between aluminum plates at room temperature (25° C.) and compressed by press. The aluminum plates had an area of 30 cm×30 cm and had grooves having a depth of 0.5 mm formed irregularly on the smooth surface in various directions. The sheet was pressed by applying thereto a pressure of 250 kg/cm$^2$ for 10 seconds.

Thus, a leather-like foamed sheet was obtained and the sheet had a basis weight of 404 g/m$^2$, a thickness of 2.07 mm, a density of 0.20 g/cc, and a flexibility of 11,672 mg.

EXAMPLE 4

In the example, a foamed sheet was repeatedly compressed. The details were as follows.

The secondary foamed sheet obtained in Example 1 was passed twice through the embossing rolls used in Example 1. In this case, the revolution rate of the rolls was 3 r.p.m. as in Example 1. The leather-like sheet became more rich in flexibility. The leather-like sheet obtained had a basis weight of 404 g/m$^2$, a thickness of 1.41 mm, a density of 0.28 g/cc, and a flexibility of 10,893 mg.

EXAMPLE 5

In this example, by rubbing the surface of the leather-like sheet obtained in Example 1 with a sand paper, a back skin-like sheet was obtained. The details were as follows.

A sand paper of #400 was used. The sand paper was placed on the surface of the leather-like sheet obtained in Example 1 and while pressing the sand paper, the surface of the sheet was rubbed 6 times with the sand paper, whereby the surface of the leather-like sheet became back skin-like. The back skin-like sheet obtained had a basis weight of 404 g/m$^2$, a thickness of 1.56 mm, a density of 0.25 g/cc, and a flexibility of 11,472 mg.

EXAMPLE 6

In this example, the secondary foamed sheet obtained in Example 1 was passed through the embossing rolls and thereafter, the secondary foamed sheet was crumpled. The details were as follows.

The secondary foamed sheet obtained in Example 1 was passed once through the embossing rolls used in Example 1. The leather-like sheet of 30 cm×30 cm thus obtained was two-folded, placed between two aluminum plates, and both the ends of the sheet were fixed to the surface of each aluminum plate with an adhesive. The aluminum plates were placed horizontally, a weight of 5 kg was placed thereon, the upper aluminum plate was reciprocated at 6 times/minute, and the sheet was crumpled by reciprocating the aluminum plate 30 times.

The sheet obtained was a leather-like sheet enriched with flexibility and the sheet had a basis weight of 404 g/m², a thickness of 1.05 mm, a density of 0.24 g/cc, and a flexibility of 8,862 mg.

EXAMPLE 7

(Production of primary foamed sheet)

By using polyethylene terephthalate ("TR 8580", trade name, made by Teijin Limited) as PAT, the following composition was prepared.

| PAT | 100 parts |
| --- | --- |
| Talc | 0.6 part |
| Pyromellitic Anhydride | 0.30 part |
| Sodium Carbonate | 0.1 part |

The aforesaid composition was placed in an extruder having a diameter of 65 mm and the temperature of the supply portion of the extruder was set at 280° C., the temperature of the compressing portion at 285° C., the temperature of the melting portion at 270° C., the temperature of the head portion at 275° C., the temperature of the die at 270° C., and the revolution number of the screw at 25 r.p.m., respectively. Also, while pressing 1.1 parts of butane as a foaming agent into the composition from the intermediate portion of the extruder, the composition was extruded. In this case, an annular die having an inside diameter of 60 mm and a slit width of 0.4 mm was used. Also, a plug having a diameter of 205 mm and a length of 740 mm was equipped to the top of the die and the plug was quenched with water of 25° C.

The cylindrical foamed sheet thus obtained was opened by cutting to provide a flat sheet which was then once wound into a roll form to provide a primary foamed sheet. The primary foamed sheet had a thickness of 1.1 mm and a density of 0.30 g/cc.

(Treatment with alkali solution)

The foamed sheet obtained above was immersed in a 30% sodium hydroxide aqueous solution for 30 minutes at 80° C. The continuous cell ratio of the foamed sheet obtained was 48% and the water absorption was 54%. The sodium hydroxide aqueous solution immersed in the foamed sheet was then removed by a large quantity of water.

On the other hand, the continuous cell ratio of a foamed sheet which had not been treated with the alkali solution was 4% and the water absorption was 0.7%.

(Production of secondary foamed sheet)

The primary foamed sheet thus treated with an alkali solution was brought into contact with steam of 100° C. for 3 minutes to further foam it. There was thus obtained a secondary foamed sheet.

Figure 5:
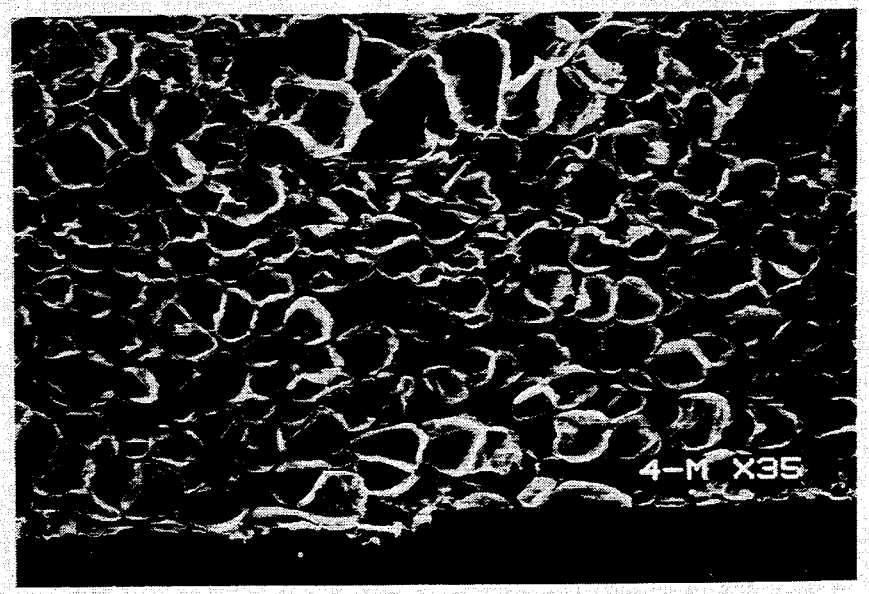
FIG. 5 is a microscopic photograph (magnification: about 35 times) showing an enlarged cross section of one example of the leather-like PAT foamed sheet having been treated with an alkali solution.

The secondary foamed sheet had a thickness of 3.8 mm, a density of 0.087 g/cc, and a crystallinity of 22%. A microscopic photograph (magnification: about 35 times) to show a cross section of the cell structure of this foamed sheet in the thickness direction is given in FIG. 5(b).

(Treatment of secondary foamed sheet)

For softening the secondary foamed sheet obtained above, the sheet was passed twice through the embossing rolls used in Example 1. In this case, the revolution rate of the rolls was 3 r.p.m. as in Example 1. The leather-like sheet obtained was rich in flexibility and had a basis weight of 326 g/m², a thickness of 1.3 mm, a density of 0.25 g/cc, and a flexibility of 7,976 mg.

EXAMPLE 8

(Production of primary foamed sheet)

A primary foamed sheet was prepared in the same manner as in Example 7.

(Production of secondary foamed sheet)

The primary foamed sheet was brought into contact with steam of 100° C. for 5 minutes to cause secondary foaming and then allowed to cool at room temperature to provide a secondary foamed sheet. The secondary foamed sheet had a basis weight of 330 g/m², a thickness of 4.1 mm, and a density of 0.08 g/cc (The time difference between the production of the primary foamed sheet and the production of the secondary foamed sheet was 2 weeks.)

(Treatment of secondary foamed sheet)

For softening the secondary foamed sheet obtained above, the foamed sheet was compressed by embossing tools. As the embossing rolls, a pair of rolls each having a diameter of 14 cm were used and the gap between the rolls was 0.3 mm. On the surface of the roll, grooves having a width of 0.2 mm and a depth of 0.5 mm were formed at an interval of 1 mm in both the axial direction and the peripheral direction of the roll. Also, the revolution rate of the rolls was 3 r.p.m. and the secondary foamed sheet was passed once through the rolls.

(Treatment with alkali solution)

The thus obtained leather-like sheet was treated with an alkali solution in the same manner as in Example 7 and further compressed by embossing rolls in the same manner as described above.

The leather-like sheet obtained had a density of 0.25 g/cc, a continuous cell ratio of 63%, a water absorption of 92%, and a flexibility of 7,608 mg.

In addition, in the above-described examples, the water absorption was calculated from ratio of the original weight of a sample and the increased weight after absorbing water according to Method A as defined in JIS K7209, and the continuous cell ratio was calculated according to ASTM D2856.

While the invention has been described in detail and with reference to specific embodiments thereof, it will be apparent to one skilled in the art that various changes and modifications can be made therein without departing from the spirit and scope thereof.

What is claimed is:

1. A process of producing a leather-like thermoplastic polyester series resin sheet having a density of 0.15–0.5 g/cm³ and a flexibility of not more than 20,000 mg in the Gurley flexibility test, which comprises foaming a thermoplastic polyester series resin containing a foaming agent by extrusion to form a foamed sheet, quenching the foamed sheet at a high temperature directly after extrusion to a temperature below the glass transition point of the resin to provide a primarily foamed sheet having a crystallinity of the resin of not higher than 30%, heating the primarily foamed sheet to a temperature of at least 60° C. to provide a secondarily foamed sheet having cells of a diameter of substantially not greater than 1 mm and having a cell wall thickness of substantially not greater than 100 μm, and thereafter irregularly bending said cell walls by applying a force of compression or bending to the secondarily foamed sheet at a temperature below the glass transition point of the resin.

2. The process of claim 1, wherein the force of compression or bending is applied to the secondarily foamed sheet by passing the secondarily foamed sheet through at least a pair of rolls.

3. The process of claim 2, wherein said at least a pair of rolls are embossing rolls.

4. The process of claim 1, wherein the secondarily foamed sheet is compressed by a press.

5. A process of producing a leather-like thermoplastic polyester series resin sheet having a density of 0.15–0.5 g/cm$^3$ and a flexibility of not more than 20,000 mg in the Gurley flexibility test, which consists essentially of applying a force of compression or bending to a uniformly and finely foamed sheet comprising a thermoplastic polyester series resin having cells of a diameter of substantially not longer than 1 mm and a cell wall thickness of not thicker than 100 μm to irregularly bend said cell walls and then immersing the foamed sheet in a strong alkali solution to form continuous cells, the proportion of continuous cells in said foamed sheet being 30–80%.

6. The process of claim 5, wherein the pH of the strong alkali solution is at least 12.5.

7. A process of producing a leather-like thermoplastic polyester series resin sheet having a density of 0.15–0.5 g/cm$^3$ and a flexibility not more than 20,000 mg in the Gurley flexibility test, which consists essentially of immersing a uniformly and finely foamed sheet composed of a thermoplastic polyester series resin having cells of a diameter of substantially not longer than 1 mm and a cell wall thickness of substantially not thicker than 100 μm in a strong alkali solution to form continuous cells and then irregularly bending said cell walls by applying a force of compression or bending to the aforesaid foamed sheet.

* * * * *